US012727708B2

(12) United States Patent
Yi et al.

(10) Patent No.: US 12,727,708 B2
(45) Date of Patent: Sep. 8, 2026

(54) BREWING DEVICE

(71) Applicant: Zhongshanshi Keliko Technology Co., Ltd., Zhongshan City (CN)

(72) Inventors: Quncai Yi, Zhongshan City (CN); Jinyong Dai, Zhongshan City (CN)

(73) Assignee: ZHONGSHANSHI KELIKO TECHNOLOGY CO., LTD., Zhongshan City (CN)

( * ) Notice: Subject to any disclaimer, the term of this patent is extended or adjusted under 35 U.S.C. 154(b) by 1168 days.

(21) Appl. No.: 17/773,158

(22) PCT Filed: Dec. 13, 2019

(86) PCT No.: PCT/CN2019/125127
§ 371 (c)(1),
(2) Date: Apr. 29, 2022

(87) PCT Pub. No.: WO2021/088205
PCT Pub. Date: May 14, 2021

(65) Prior Publication Data

US 2023/0218106 A1 Jul. 13, 2023

(30) Foreign Application Priority Data

Nov. 8, 2019 (CN) ........................ 201911086266.1

(51) Int. Cl.
*A47J 31/44* (2006.01)
*A47J 31/46* (2006.01)

(52) U.S. Cl.
CPC ........... *A47J 31/4403* (2013.01); *A47J 31/46* (2013.01)

(58) Field of Classification Search
CPC .... A47J 31/4403; A47J 31/46; A47J 31/3614; A47J 31/00

(Continued)

(56) References Cited

U.S. PATENT DOCUMENTS 5,647,269 A 7/1997 Miller et al.
7,024,985 B2 * 4/2006 Park .................... A47J 31/3614 99/289 R (Continued)

FOREIGN PATENT DOCUMENTS

CN 1530058 A 9/2004
CN 102973156 A 3/2013

(Continued)

OTHER PUBLICATIONS

English Translation of EP 2033550 A2 (Year: 2025).*

(Continued)

*Primary Examiner* — Edward F Landrum
(74) *Attorney, Agent, or Firm* — D'Ambrosio & Menon, PLLC; Usha Menon

(57) ABSTRACT

A brewing device includes a support, a body, a water-inlet sealing plate assembly and a water-outlet sealing plate assembly. The support is provided with a mounting cavity in which the body is detachably mounted, a brewing cavity with a water inlet and a water outlet at two ends is provided in the body, and a feeding port for coffee powder to enter is provided in a side portion of the brewing cavity, the water-inlet sealing plate assembly includes a first sealing plate movably mounted in the body, and a first power source for opening and closing the water inlet and mounted on the support, and the first power source is configured for driving the first sealing plate to act, the water-outlet sealing plate assembly is mounted on the support, and an output end of the water-outlet sealing plate assembly is configured for sliding in the brewing cavity.

8 Claims, 4 Drawing Sheets

(58) Field of Classification Search
USPC .......................................................... 99/275
See application file for complete search history.

(56) References Cited

U.S. PATENT DOCUMENTS

| | | | | |
|---|---|---|---|---|
| 8,247,010 B2 * | 8/2012 | Nguyen | ............. | A47J 31/3614 99/290 |
| 2007/0012196 A1 * | 1/2007 | Sato | .................... | A47J 31/3619 99/348 |

FOREIGN PATENT DOCUMENTS

| | | | | |
|---|---|---|---|---|
| CN | 204232918 U | 4/2015 | | |
| CN | 206197767 U | 5/2017 | | |
| CN | 110269517 A | 9/2019 | | |
| CN | 110859511 A | 3/2020 | | |
| CN | 211484068 A | 9/2020 | | |
| EP | 2033550 A2 * | 3/2009 | .......... | A47J 31/3614 |
| JP | 2002-223949 A | 8/2002 | | |

OTHER PUBLICATIONS

International Search Report issued by the China National Intellectual Property Administration for corresponding International Patent Application No. PCT/CN2019/125127, mailed Jul. 28, 2020, with an English translation.
Written Opinion of the International Searching Authority issued by the China National Intellectual Property Administration for corresponding International Patent Application No. PCT/CN2019/125127, mailed Jul. 28, 2020, with an English translation.
CNIPA Office Action and Search Report dated Jun. 28, 2024 for related App. No. 2019110862661.
KIPO Office Action and Search Report dated Jun. 27, 2024 for related App. No. 20-2022-7000033.

* cited by examiner

BREWING DEVICE

CROSS-REFERENCE TO RELATED APPLICATIONS

This application is a national stage filing under 35 U.S.C. § 371 of international application number PCT/CN2019/125127, filed Dec. 13, 2019, which claims priority to Chinese patent application No. 2019110862661 filed Nov. 8, 2019. The contents of these applications are incorporated herein by reference in their entirety.

TECHNICAL FIELD

The disclosure relates to the technical field of coffee machines, and more particularly, to a brewing device.

BACKGROUND

Coffee machine is a device integrating powder grinding, pressing, loading, brewing and residue removing, which can realize the automatic control of the whole process of brewing coffee.

The existing coffee machine generally includes a shell and a brewing device for brewing coffee. The brewing device generally needs to be detachably mounted in the shell for later maintenance and cleaning. The existing brewing device has a complicated structure and unreasonable pipeline layout. To this end, the disclosure provides a brewing device with a simple structure.

SUMMARY

An object of the disclosure is to at least solve one of the technical problems in the existing technology, and to provide a brewing device, which can simplify the structure of the existing brewing device.

According to one aspect of the disclosure, a brewing device is provided, including:

a support provided with a mounting cavity;

a body, wherein the body is detachably mounted in the mounting cavity, a brewing cavity is provided in the body, a water inlet and a water outlet are respectively formed in two ends of the brewing cavity, and a feeding port for coffee powder to enter is provided in a side portion of the brewing cavity;

a water-inlet sealing plate assembly, including a first sealing plate and a first power source, wherein the first sealing plate is movably mounted in the body, the first sealing plate is configured for opening and closing the water inlet, the first power source is mounted on the support, and the first power source is configured for driving the first sealing plate to act; and a water-outlet sealing plate assembly mounted on the support, wherein an output end of the water-outlet sealing plate assembly is configured for sliding in the brewing cavity.

Preferably, the water-inlet sealing plate assembly further includes a driving plate and an intermediate plate, wherein one end of the driving plate is rotatably mounted in the body through a first rotating shaft, the other end of the driving plate is hinged with one end of the intermediate plate, the other end of the intermediate plate is hinged with the first sealing plate through a second rotating shaft, an inner side wall of the body is provided with a first guide slot and a second guide slot, an end portion of the second rotating shaft is located in the first guide slot, the first sealing plate is provided with a guide post, and an end portion of the guide post is located in the second guide slot.

Preferably, the first power source includes a first motor and a reducer, one end of the first rotating shaft is provided with a connecting hole and extends out of the body, the first motor and the reducer are mounted on the support, the first motor is connected with an input end of the reducer, and an output end of the reducer is in transmission connection with the connecting hole.

Preferably, the output end of the reducer is connected with an output shaft, the output shaft is rotatably mounted on the support, and the output shaft extends into the mounting cavity.

Preferably, the water-inlet sealing plate assembly further includes a water inlet pipeline, the water inlet pipeline includes a first interface, a duct and a water inlet channel arranged in the first sealing plate, the first interface is arranged penetrating through a side wall of the body, and the first interface is communicated with the water inlet channel through the duct; and the support is provided with a second interface, and the second interface extends into the mounting cavity.

Preferably, the water-outlet sealing plate assembly includes a second sealing plate and a second power source, the second sealing plate is slidably mounted on the support, the second power source is mounted on the support, and an output end of the second power source is in transmission connection with the second sealing plate; and a water outlet channel is arranged penetrating through the second sealing plate.

Preferably, the second power source is a second motor, the support is rotatably provided with a gear, and the gear is provided with a threaded hole; one side of the second sealing plate is fixedly connected with a screw, the screw is in threaded connection with the threaded hole, and an output end of the second motor is in transmission connection with the gear.

Preferably, a limit plate is rotatably arranged on the support, the mounting cavity is provided with an opening for the body to enter and exit, and the limit plate is configured for opening and closing the opening.

Preferably, the body includes an inclined section and a horizontal section, the brewing cavity is located in the inclined section, the horizontal section is butted with the water inlet at a position below which a discharging opening is arranged, and the driving plate and the intermediate plate are located at an end portion of the horizontal section far away from the discharging opening.

Preferably, the first guide slot includes a first section and a second section which are connected with each other, the first section is parallel to a center line of the brewing cavity, and an included angle between the second section and the first section is set at 90 degrees to 135 degrees; the second guide slot includes a third section and a fourth section which are connected with each other, the third section is parallel to the center line of the brewing cavity, and an included angle between the third section and the fourth section is set at 90 degrees to 135 degrees.

Any of the above technical themes at least has the following beneficial effects: the body in the foregoing technical themes can be independently moved out relative to the support, and the water-outlet sealing plate assembly and the first power source are located on the support, such that the body can be simplified in structure, and a size of the body can be reduced, which is convenient to disassemble and assemble the body.

BRIEF DESCRIPTION OF THE DRAWINGS

The disclosure is further described hereinafter with reference to the drawings and the embodiments.

DETAILED DESCRIPTION

Figure 1:
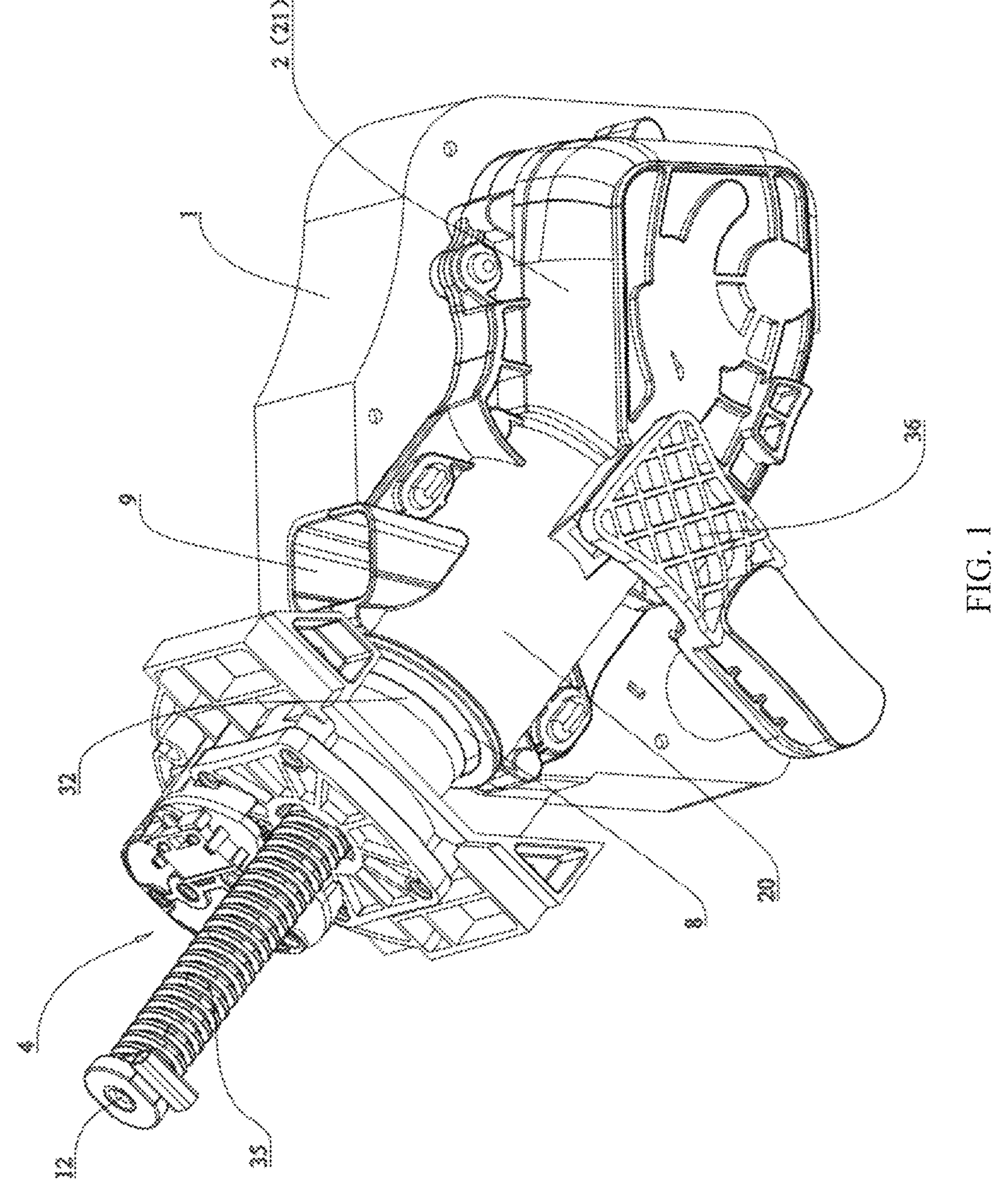
FIG. 1 is a schematic diagram of an embodiment of the disclosure.

The detailed embodiments of the disclosure will be described in detail, the preferred embodiments of the disclosure are shown in the drawings, the drawings are intended to supplement the description in the written portion of the specification with figures, so that people can intuitively and vividly understand each technical feature and the overall technical theme of the disclosure, but it shall not be understood as a limitation to the protection scope of the disclosure.

In the description of the present disclosure, it should be understood that, descriptions relating to orientation, for example, orientation or positional relationships indicated by "up", "down", "front", "back", "left", "right", etc. are based on the orientation or positional relationships shown in the accompanying drawings, and are to facilitate the description of the present disclosure and simplify the description only, rather than indicating or implying that the device or element referred to must have a specific orientation or be constructed and operated in a specific orientation, and therefore cannot be construed as limiting the present disclosure.

In the description of the present disclosure, the meaning of "several" is one or more, the meaning of "a plurality of" is two or more, "greater than", "less than", "more than", etc. are to be understood to exclude the given figure, and "above", "below", "within", etc. are understood to include the given figure. If "first" and "second", etc. are referred to, it is only for the purpose of distinguishing technical features, and shall not be understood as indicating or implying relative importance or implying the number of the indicated technical features or implying the sequence of the indicated technical features.

In the description of the present disclosure, unless otherwise explicitly defined, the words such as "set", "install", and "connect" should be understood in a broad sense, and those of ordinary skills in the art can determine the specific meanings of the above words in the present disclosure in a rational way in combination with the specific contents of the technical themes.

Referring to FIG. 1 to FIG. 4, a brewing device includes: a support 1, a body 2, a water-inlet sealing plate assembly 3 and a water-outlet sealing plate assembly 4. The support 1 is provided with a mounting cavity 5. The body 2 is detachably mounted in the mounting cavity 5, a brewing cavity 6 is provided in the body 2, a water inlet 7 and a water outlet 8 are respectively formed in two ends of the brewing cavity 6, and a feeding port 9 for coffee powder to enter is provided in a side portion of the brewing cavity 6. The water-inlet sealing plate assembly 3 includes a first sealing plate 10, a water inlet pipeline and a first power source 11, the first sealing plate 10 is movably mounted in the body 2, the first sealing plate 10 is configured for opening and closing the water inlet 7, the first power source 11 is mounted on the support 1, and the first power source 11 is configured for driving the first sealing plate 10 to act. The water-outlet sealing plate assembly 4 is mounted on the support 1, the water-outlet sealing plate assembly 4 is provided with a water outlet channel 12, and an output end of the water-outlet sealing plate assembly 4 is configured for sliding in the brewing cavity 6. The specific operation principle of the above embodiment is as follows. In an initial state, the first sealing plate 10 seals the water inlet 7, the coffee powder enters from the feeding port 9, then the output end of the water-outlet sealing plate assembly 4 moves towards inside of the brewing cavity 6, and cooperates with the first sealing plate 10 to form a closed cavity body in the brewing cavity 6. Then, high-temperature water is injected through the water inlet pipeline to brew the coffee powder. After brewing, the output end of the water-outlet sealing plate assembly 4 continues to slide towards inside of the brewing cavity 6, and the brewed coffee is extruded from the water outlet channel. The body 2 in the embodiment can be independently moved out relative to the support 1, and the water-outlet sealing plate assembly 4 and the first power source 11 are located on the support 1, such that the body 2 can be simplified in structure, and a size of the body 2 can be reduced, which is convenient to disassemble and assemble the body 2.

Figure 3:
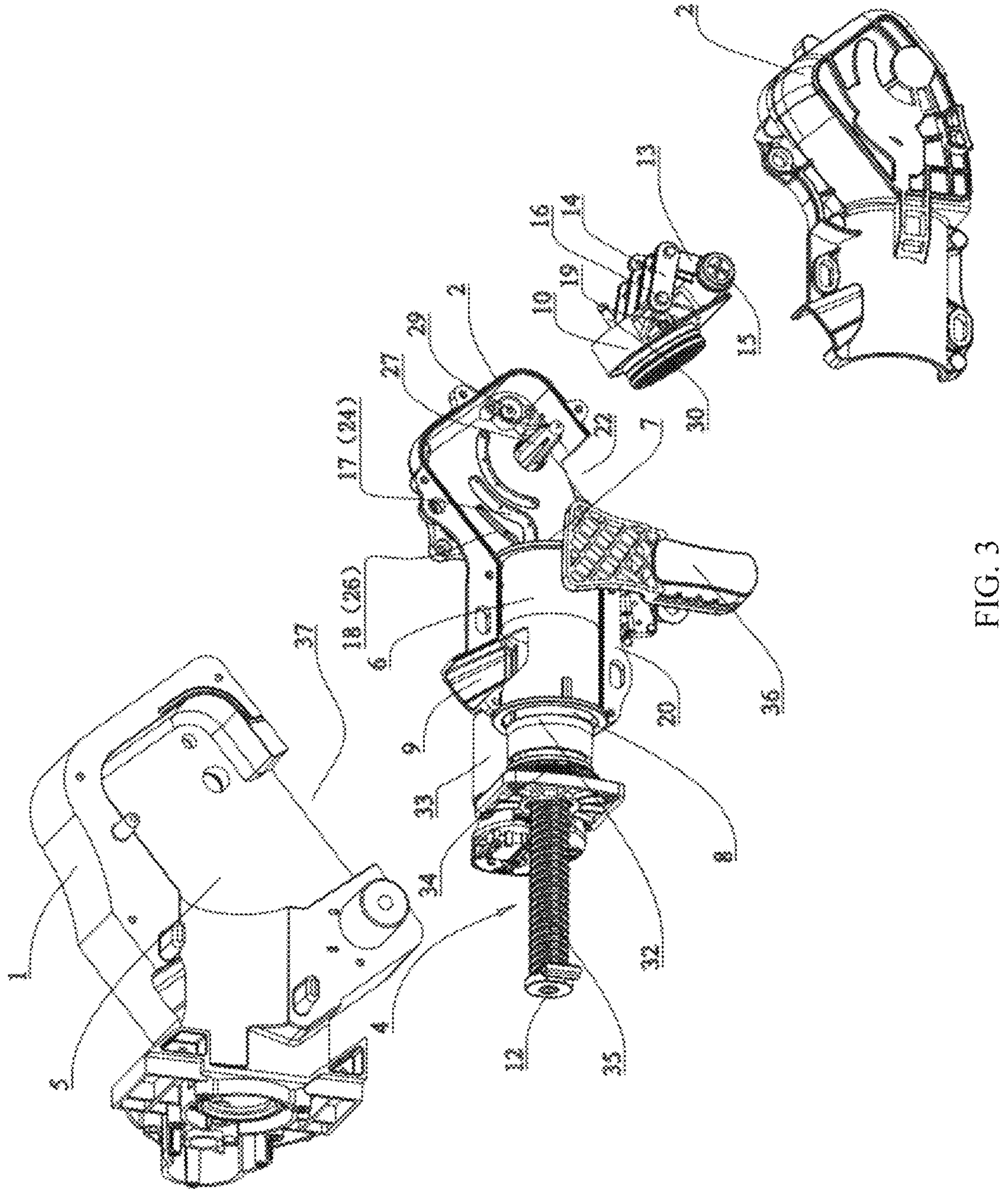
FIG. 3 is a second exploded schematic diagram of FIG. 1.

As shown in FIG. 3, in some embodiments, the water-inlet sealing plate assembly 3 further includes a driving plate 13 and an intermediate plate 14, one end of the driving plate 13 is rotatably mounted in the body 2 through a first rotating shaft 15, the other end of the driving plate 13 is hinged with one end of the intermediate plate 14, the other end of the intermediate plate 14 is hinged with the first sealing plate 10 through a second rotating shaft 16, an inner side wall of the body 2 is provided with a first guide slot 17 and a second guide slot 18, an end portion of the second rotating shaft 16 is located in the first guide slot 17, the first sealing plate 10 is provided with a guide post 19, an end portion of the guide post 19 is located in the second guide slot 18, and the first power source 11 is configured for driving the driving plate 13 to act. The driving plate 13, the intermediate plate 14 and the first sealing plate 10 are all located in the body 2, which may be combined with the first guide slot 17 and the second guide slot 18 to limit a movement track of the first sealing plate 10. The arrangement of the driving plate 13 and the intermediate plate 14 can amplify the power output from the first power source 11, so as to provide enough power for the first sealing plate 10. The water-inlet sealing plate assembly 3 above has a simple and ingenious structure, occupies a small volume, is beneficial to being separated from the first power source 11, and works stably and reliably.

As shown in FIG. 3, in some embodiments, in order to facilitate discharging coffee grounds, the body 2 includes an inclined section 20 and a horizontal section 21, the brewing cavity 6 is located in the inclined section 20, the horizontal section 21 is butted with the water inlet 7 at a position below which a discharging opening 22 is arranged, and the driving plate 13 and the intermediate plate 14 are located at an end portion of the horizontal section 21 far away from the discharging opening 22. After the coffee is brewed, coffee grounds are generally attached to the first sealing plate 10, so that the coffee grounds may automatically be discharged from the brewing cavity 6 and then leave the body 2 through the discharging opening 22 when the water inlet 7 is opened by the first sealing plate 10. The embodiment of the body 2 above has a reasonable layout, which is beneficial to discharging coffee grounds and simplifies the overall structure.

As shown in FIG. 3, in some embodiments, the movement track of the first sealing plate 10 may be designed according to shapes of the first guide slot 17 and the second guide slot 18. After the coffee is brewed, the coffee grounds need to be discharged. In order to discharge the coffee grounds smoothly, the first sealing plate 10 needs to be rotated to face the ground. To this end, in this embodiment, the following design is made: the first guide slot 17 includes a first section 23 and a second section 24 which are connected with each other, the first section 23 is parallel to a center line of the brewing cavity 6, and an included angle between the second section 24 and the first section 23 is set at 90 degrees to 135 degrees; the second guide slot 18 includes a third section 25 and a fourth section 26 which are connected with each other, the third section 25 is parallel to the center line of the brewing cavity 6, and an included angle between the third section 25 and the fourth section 26 is set at 90 degrees to 135 degrees. Under the limitation of the first guide slot 17 and the second guide slot 18, the first sealing plate 10 is close to the brewing cavity 6 in a state perpendicular to the center line of the brewing cavity 6. After the first sealing plate 10 is completely opened, the first sealing plate 10 inclines or vertically faces downwards, so that the coffee grounds on the first sealing plate 10 can be discharged. The design of the first guide slot 17 and the second guide slot 18 can realize that the first sealing plate 10 runs according to a set track, which is very convenient, is simpler in comparison to designing the movement track of the first sealing plate 10 by purely using a connecting rod structure, saves parts and saves the internal space.

Figure 4:
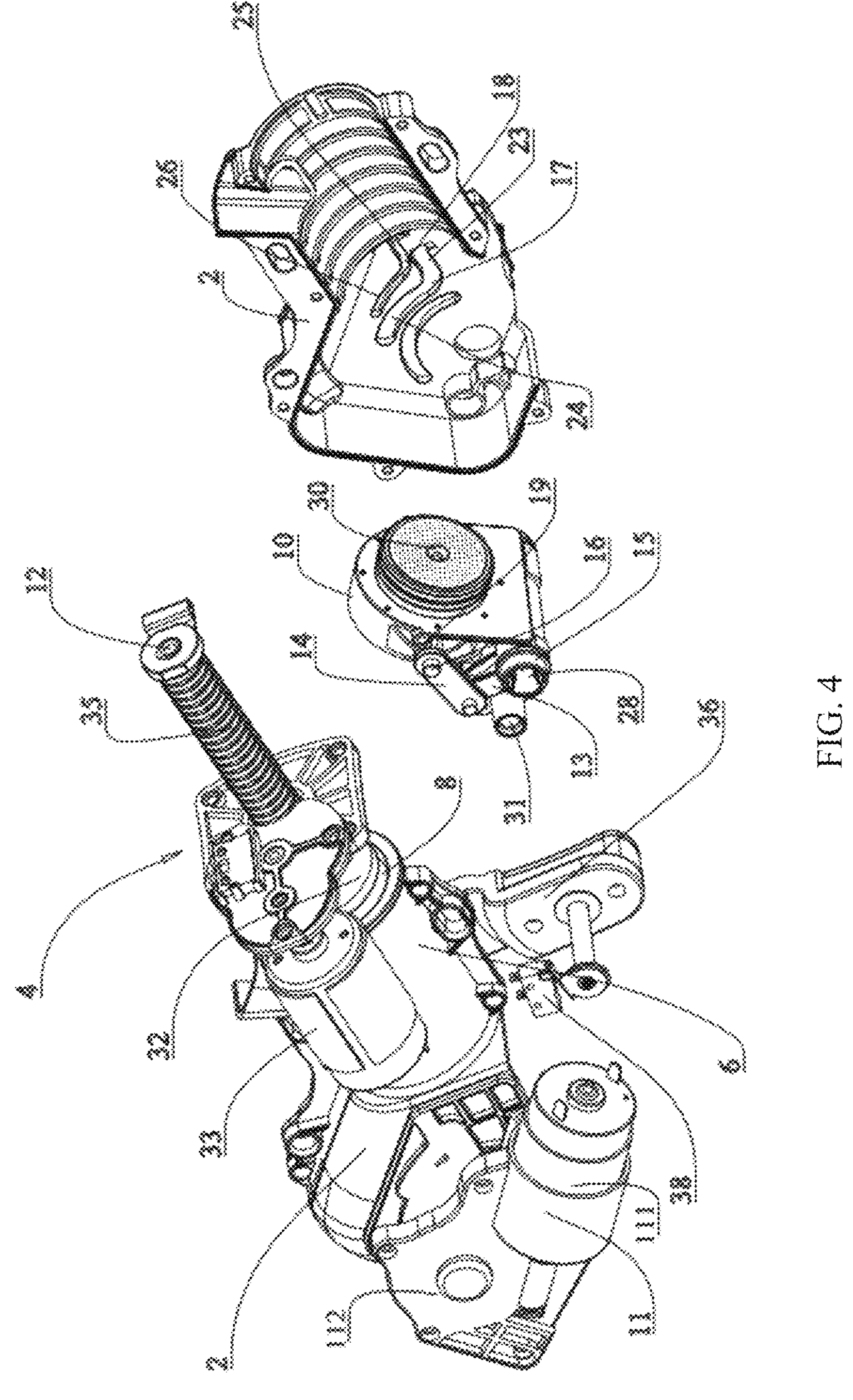
FIG. 4 is a third exploded schematic diagram of FIG. 1.

As shown in FIG. 3 and FIG. 4, in some embodiments, the first power source 11 includes a first motor 111 and a reducer 112, one end of the first rotating shaft 15 is provided with a connecting hole 28 and extends out of the body 2, the first motor 111 and the reducer 112 are mounted on the support 1, the first motor 111 is connected with an input end of the reducer 112, and an output end of the reducer 112 is in transmission connection with the connecting hole 28. The reducer 112 may use a worm gear or gear box to reduce the speed. The output end of the reducer 112 is connected with an output shaft 27, the output shaft 27 is rotatably mounted on the support 1, and the output shaft 27 extends into the mounting cavity 5. In this way, during the process of mounting the body 2 into the mounting cavity 5, the output shaft 27 is synchronously inserted into the connecting hole 28, an inner side wall of the connecting hole 28 is provided with a bulge, and an outer side wall of the output shaft 27 is provided with a recess matched with the bulge. By means of the bulge and the recess, a transmission connection is formed. From the above, it can be seen that the transmission connection between the first power source 11 and the first sealing plate 10 is very convenient, and the first power source 11 arranged on the support 1 does not cause any adverse influence on the driving of the first sealing plate 10. The structure is very ingenious and practical.

As shown in FIG. 3 and FIG. 4, in some embodiments, the water inlet pipeline includes a first interface 29, a duct and a water inlet channel 30 arranged in the first sealing plate 10, the first interface 29 is arranged penetrating through a side wall of the body 2, and the first interface 29 is communicated with the water inlet channel 30 through the duct. The support 1 is provided with a second interface 31, and the second interface 31 extends into the mounting cavity 5. The first interface 29 and the second interface 31 are of a plug-in connection structure, and the connection between the first interface 29 and the second interface 31 may be completed synchronously in the process of mounting the body 2 into the mounting cavity 5, which is very convenient. The duct is located in the body 2, that is, the duct can't be observed outside the body 2, so that the problem of duct layout disorder does not exist, and the possibility of duct winding or scraping is reduced.

Figure 2:
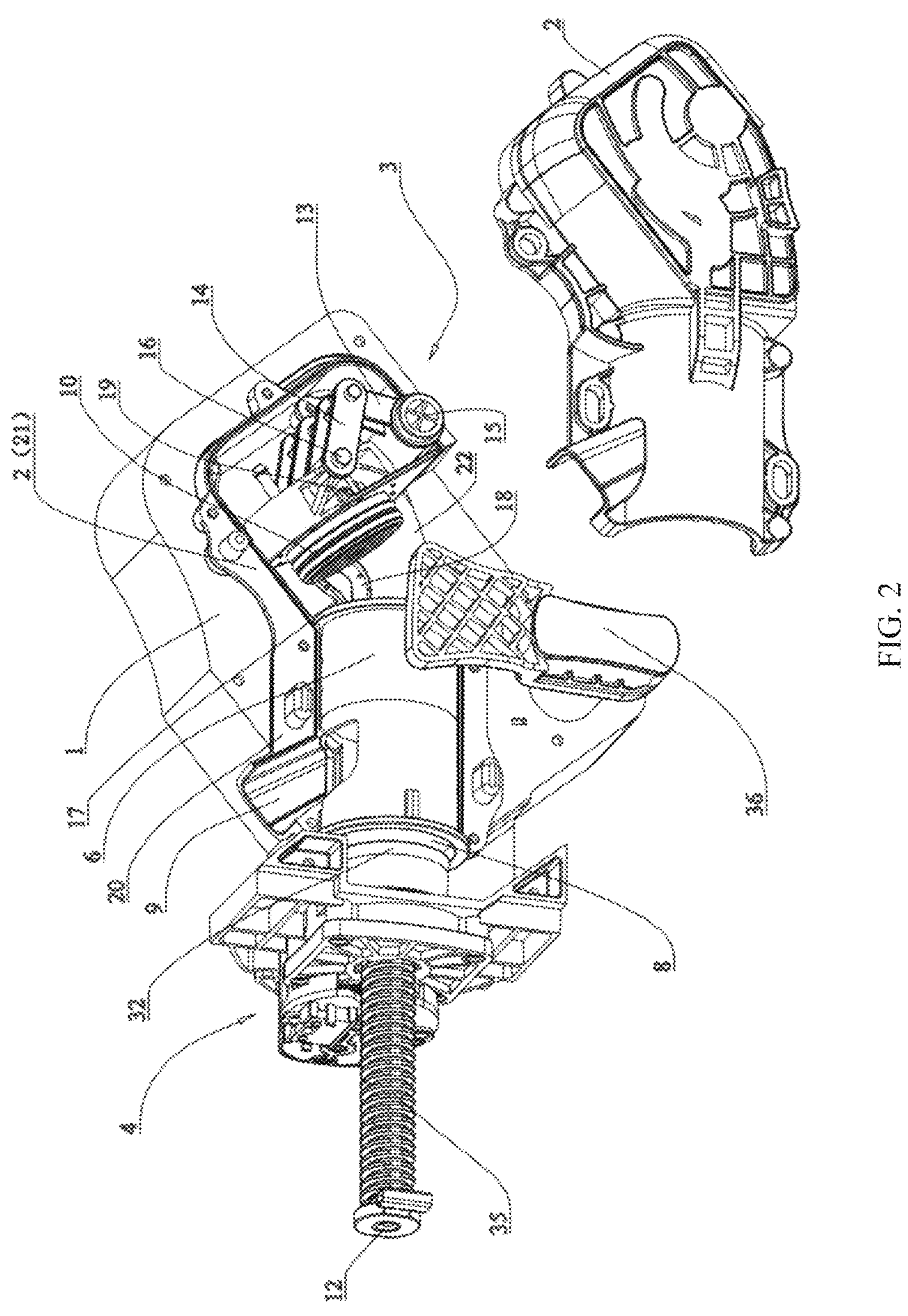
FIG. 2 is a first exploded schematic diagram of FIG. 1.

As shown in FIG. 2, in some embodiments, the water-outlet sealing plate assembly 4 includes a second sealing plate 32 and a second power source 33, the second sealing plate 32 is slidably mounted on the support 1, the second power source 33 is mounted on the support 1, and an output end of the second power source 33 is in transmission connection with the second sealing plate 32; and the water outlet channel 12 is arranged penetrating through the second sealing plate 32. The second power source 33 is a second motor, the support 1 is rotatably provided with a gear 34, and the gear 34 is provided with a threaded hole; one side of the second sealing plate 32 is fixedly connected with a screw 35, the screw 35 is in threaded connection with the threaded hole, and an output end of the second motor is in transmission connection with the gear. A side wall of the screw 35 is provided with a third guide slot, and the support 1 is provided with a limiting block. The limiting block is inserted into the third guide slot, so as to prevent the screw 35 rotating relative to the support 1, so that the screw 35 can only slide relative to the support 1. The action principle of the water-outlet sealing plate assembly 4 in the above embodiment is as follows: the second motor works, and the second motor drives the gear to rotate through a reduction gear set, and the gear cooperates with the screw 35. As the screw 35 cannot rotate, the screw 35 can only slide relative to the support 1, and then drives the second sealing plate 32 to slide in the brewing cavity 6. Certainly, those of ordinary skills in the art can understand that the second power source 33 may be implemented in other ways, such as using an air cylinder or oil cylinder or a linear motor for driving.

As shown in FIG. 4, in some embodiments, a limit plate 36 is rotatably arranged on the support 1, the mounting cavity 5 is provided with an opening 37 for the body 2 to enter and exit, and the limit plate 36 is configured for opening and closing the opening 37. The support 1 is also provided with a microswitch 38, and the microswitch 38 is configured to detect a state of the limit plate 36. When the limit plate 36 is in the position of opening the opening 37, the coffee machine cannot work, and only when the limit plate 36 is in the position of closing the opening 37, the coffee machine can work normally. By arranging the limit plate 36, the body 2 can be prevented from accidentally sliding out, thus ensuring the normal operation of the coffee machine.

The embodiments of the disclosure are described in detail with reference to the drawings above, but the disclosure is not limited to the above embodiments, and various changes may also be made within the knowledge scope of those of ordinary skills in the art without departing from the purpose of the disclosure.

The invention claimed is:

1. A brewing device, comprising:

a support provided with a mounting cavity;

a body, wherein the body is detachably mounted in the mounting cavity, a brewing cavity is provided in the body, a water inlet and a water outlet are respectively formed in two ends of the brewing cavity, and a feeding port for coffee powder to enter is provided in a side portion of the brewing cavity;

a water-inlet sealing plate assembly, comprising a first sealing plate and a first power source, wherein the first sealing plate is movably mounted in the body, the first sealing plate is configured for opening and closing the water inlet, the first power source is mounted on the support, and the first power source is configured for driving the first sealing plate to act; and a water-outlet sealing plate assembly mounted on the support, wherein an output end of the water-outlet sealing plate assembly is configured for sliding in the brewing cavity;

wherein the water-inlet sealing plate assembly further comprises a driving plate and an intermediate plate, one end of the driving plate is rotatably mounted in the body through a first rotating shaft, the other end of the driving plate is hinged with one end of the intermediate plate, the other end of the intermediate plate is hinged with the first sealing plate through a second rotating shaft, an inner side wall of the body is provided with a first guide slot and a second guide slot, an end portion of the second rotating shaft is located in the first guide slot, the first sealing plate is provided with a guide post, and an end portion of the guide post is located in the second guide slot;

wherein the body comprises an inclined section and a horizontal section, the brewing cavity is located in the inclined section, the horizontal section is butted with the water inlet at a position below which a discharging opening is arranged, and the driving plate and the intermediate plate are located at an end portion of the horizontal section away from the discharging opening.

2. The brewing device according to claim 1, wherein the first power source comprises a first motor and a reducer, one end of the first rotating shaft is provided with a connecting hole and extends out of the body, the first motor and the reducer are mounted on the support, the first motor is connected with an input end of the reducer, and an output end of the reducer is in transmission connection with the connecting hole.

3. The brewing device according to claim 2, wherein the output end of the reducer is connected with an output shaft, the output shaft is rotatably mounted on the support, and the output shaft extends into the mounting cavity.

4. The brewing device according to claim 2, wherein the water-inlet sealing plate assembly further comprises a water inlet pipeline, the water inlet pipeline comprises a first interface, a duct and a water inlet channel arranged in the first sealing plate, the first interface is arranged penetrating through a side wall of the body, and the first interface is communicated with the water inlet channel through the duct; and the support is provided with a second interface, and the second interface extends into the mounting cavity.

5. The brewing device according to claim 1, wherein the water-outlet sealing plate assembly comprises a second sealing plate and a second power source, the second sealing plate is slidably mounted on the support, the second power source is mounted on the support, and an output end of the second power source is in transmission connection with the second sealing plate; and a water outlet channel is arranged penetrating through the second sealing plate.

6. The brewing device according to claim 5, wherein the second power source is a second motor, the support is rotatably provided with a gear, and the gear is provided with a threaded hole; one side of the second sealing plate is fixedly connected with a screw, the screw is in threaded connection with the threaded hole, and an output end of the second motor is in transmission connection with the gear.

7. The brewing device according to claim 1, wherein a limit plate is rotatably arranged on the support, the mounting cavity is provided with an opening for the body to enter and exit, and the limit plate is configured for opening and closing the opening.

8. The brewing device according to claim 1, wherein the first guide slot comprises a first section and a second section which are connected with each other, the first section is parallel to a center line of the brewing cavity, and an included angle between the second section and the first section is set at 90 degrees to 135 degrees; the second guide slot comprises a third section and a fourth section which are connected with each other, the third section is parallel to the center line of the brewing cavity, and an included angle between the third section and the fourth section is set at 90 degrees to 135 degrees.

* * * * *